United States Patent [19]

Mochizuki et al.

[11] Patent Number: 4,630,902
[45] Date of Patent: Dec. 23, 1986

[54] COMPOUND EYE OPTICAL SYSTEM HAVING A VARIABLE MAGNIFICATION FUNCTION

[75] Inventors: Noritaka Mochizuki, Yokohama; Setsuo Minami, Kawasaki, both of Japan

[73] Assignee: Canon Kabushiki Kaisha, Tokyo, Japan

[21] Appl. No.: 731,341

[22] Filed: May 6, 1985

Related U.S. Application Data

[63] Continuation of Ser. No. 400,684, Apr. 22, 1982, abandoned.

[30] Foreign Application Priority Data

Jul. 31, 1981 [JP] Japan .................................. 56-120455

[51] Int. Cl.$^4$ ...................... G02B 15/04; G02B 15/14; G02B 27/00
[52] U.S. Cl. .................................. 350/570; 350/167; 350/451
[58] Field of Search ............... 350/560, 570, 451, 169, 350/519, 559, 167, 573, 572; 355/50

[56] References Cited

U.S. PATENT DOCUMENTS

| | | | |
|---|---|---|---|
| Re. 28162 | 9/1974 | Anderson | 355/50 |
| 3,305,294 | 2/1967 | Alvarez | 351/169 |
| 3,447,438 | 6/1969 | Kaüfer et al. | 350/451 |
| 3,507,565 | 4/1970 | Alvarez et al. | 351/169 |
| 3,509,804 | 5/1970 | Kohler et al. | 350/572 |
| 4,439,022 | 3/1984 | Gebhardt et al. | 350/572 |

OTHER PUBLICATIONS

Born & Wolf, "Principles of Optics", Pergamon Press, 1975 pp. 151-156 & 163-164.
Jenkins & White, "Fundamentals of Optics" McGraw-Hill 1950, pp. 36-48.

Primary Examiner—William H. Punter
Attorney, Agent, or Firm—Fitzpatrick, Cella, Harper & Scinto

[57] ABSTRACT

A compound eye optical system having a variable magnification function includes a first imaging element array having a plurality of imaging elements of the same focal length at an equal pitch, a second imaging element array having a plurality of imaging elements of the same focal length arranged at a pitch different from that of the first imaging element array, the second imaging element array disposed more adjacent to the image side than the first imaging element array, and means for varying the imaging magnification of a composite optical system comprising the first and second imaging element arrays.

5 Claims, 10 Drawing Figures

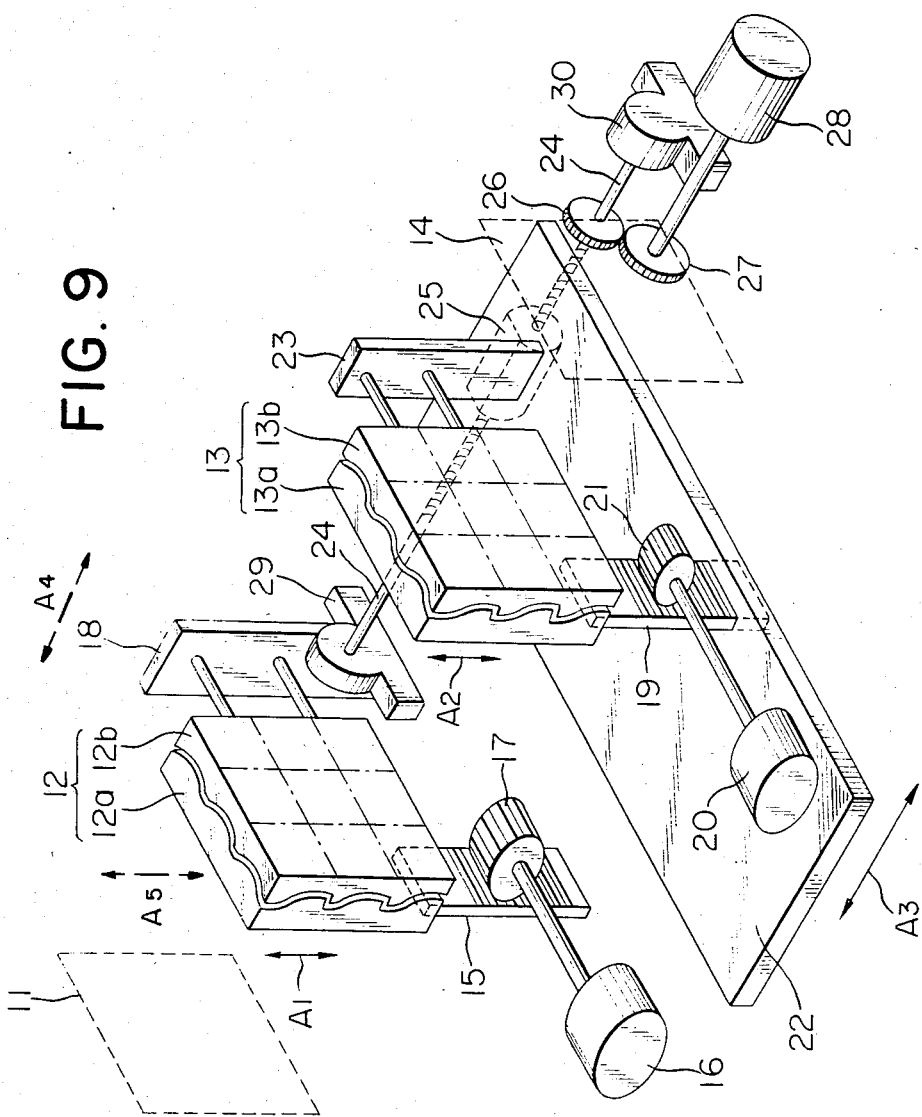

COMPOUND EYE OPTICAL SYSTEM HAVING A VARIABLE MAGNIFICATION FUNCTION

This application is a continuation of application Ser. No. 400,684 filed July 22, 1982 now abandoned.

BACKGROUND OF THE INVENTION

1. Field of the Invention

This invention relates to a compound eye optical system which is capable of forming an image of an object on the image plane while varying the imaging magnification thereof and is also capable of continuous magnification change.

2. Description of the Prior Art

A compound eye optical system forms an erect image of an object by disposing two or more minute imaging element arrays each comprising a plurality of minute imaging elements, e.g. minute lenses, arranged in an array form. The imaging magnification of the compound eye optical system is usually one-to-one magnification, but there are known compound eye optical systems in which the imaging magnification is not one-to-one magnification by making different the spacings between the minute imaging elements of the minute imaging element arrays forming the compound eye optical system. However, any of these compound eye optical systems is fixed in imaging magnification.

Although the technique of effecting magnification change in the compound eye optical system has heretofore been desired, a compound eye optical system having a variable magnification function has not been obtained because the compound eye optical system is not so simple as a single eye optical system and the conditions to be satisfied during magnification change are difficult. One of the conditions is that a multiimage of an object separately formed by a first minute imaging element array must be re-imaged as the only image on the image plane irrespective of the state of the lenses during magnification change and that the image plane must always be a plane conjugate with the object point relative to each unit imaging optical system forming the compound eye optical system.

SUMMARY OF THE INVENTION

It is an object of the present invention to provide a compound eye optical system which is capable of varying the imaging magnification of the image of an object formed on the image plane.

It is a further object of the present invention to provide a compound eye optical system which is capable of continuously varying the imaging magnification of the image of an object formed on the image plane.

The compound eye optical system according to the present invention comprises at least two minute imaging element arrays. Each imaging element array comprises a plurality of minute imaging elements equal in focal length arranged at equal intervals. A first imaging element array is provided on the object side and a second imaging element array is provided on the image side. The arrangement spacing D between the minute imaging elements of the first imaging element array differs from the arrangement spacing d between the minute imaging elements of the second imaging element array (D≠d). At least three of the following six means are provided to effect magnification change: means for varying the focal length of the first imaging element array, means for varying the focal length of the second imaging element array, means for varying the spacing between the first and the second imaging element array, means for varying the spacing between the first imaging element array and the object point, means for varying the spacing between the second imaging element array and the image point, and means for varying the ratio of the arrangement spacing of the imaging elements of the first imaging element array to the arrangement spacing of the imaging elements of the second imaging element array.

In the compound eye optical system according to the present invention, when the ratio of the arrangement spacing D of the first imaging element array to the arrangement spacing d of the second imaging element array ($Z = D/d$ and this Z will hereinafter be referred to as the pitch ratio) is 1, magnification change cannot be effected and therefore, when magnification change is to be effected, the pitch ratio Z must be deviated from the value 1. When the pitch ratio Z is expressed as $Z = D/d$ as mentioned above and where Z is greater than 1, namely, where $D > d$, the variable magnification or the imaging magnification $\beta$ of the compound eye optical system is varied in an area smaller than 1 and the image of the object is formed on the imaging plane at a reduced magnification. Conversely, when Z is smaller than 1, that is, when $D < d$, the variable magnification area of the compound eye optical system is varied in an area in which the imaging magnification $\beta$ is greater than 1, and the image of the object is formed on the imaging plane at an enlarged magnification.

When the compound eye optical system is considered realistically, the arrays of minute imaging elements are usually formed as by molding and therefore, the pitch ratio Z between the arrays is liable to become fixed. Accordingly, it is more realistic to select three means from among the means for varying the focal length of the first imaging element array, the means for varying the focal length of the second imaging element array, the means for varying spacing between the first imaging element array and the object, the means for varying the spacing between the second imaging element array and the image plane, and the means for varying the spacing between the first imaging element array and the second imaging element array and effect magnification change. Particularly, in the present invention, if the values of the focal lengths of the first and second imaging element arrays are varied, the variable magnification area can be increased and this is effective.

Where the minute imaging elements forming each of said arrays are lens systems, it is necessary in order to provide the function of varying the focal lengths thereof that a minute imaging element comprise a plurality of lenses which are movable relative to one another. Also, the minute imaging elements themselves can be made thin by using imaging elements whose focal lengths are varied by the lateral deviation system as shown in U.S. Pat. No. 3,305,294.

In the compound eye optical system according to the present invention, at least two imaging element arrays each comprising a plurality of imaging elements are necessary. Also, a field lens which does not directly participate in imaging may be provided.

The invention will become more fully apparent from the following detailed description thereof taken in conjunction with the accompanying drawings.

BRIEF DESCRIPTION OF THE DRAWINGS

FIG. 9 is a perspective view schematically showing an embodiment of the compound eye optical system according to the present invention.

DESCRIPTION OF THE PREFERRED EMBODIMENTS

Figure 1:
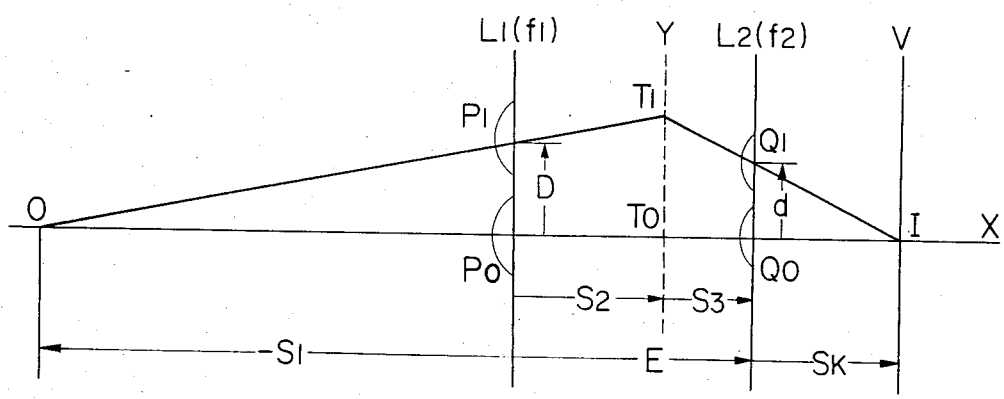
FIG. 1 is a diagram for illustrating the condition which should be satisfied by a compound eye optical system during imaging.

In order that the only image of the object point may be sharply formed on the image plane in a compound eye optical system, the following conditions are requisite:

1. That there exists such an image plane that the intermediate image of the object point separately formed by a first minute imaging element array is formed as the only object point image by a second minute imaging element array; and 2. That the only image plane of the object point lies at a position conjugate with the object point with respect to the compound eye optical system. What conditions should be imposed on the compound eye optical system in order that the compound eye optical system may satisfy these two conditions will hereinafter be described. FIG. 1 shows a compound eye optical system comprising two multilens arrays. In FIG. 1, $L_1$ and $L_2$ designate the multilens arrays spaced apart by the distance 6. The lens arrangement pitch of the multilens array $L_1$ is D and the arrangement pitch of the multilens array $L_2$ is d. The lens array $L_1$ has a focal length $f_1$ and the lens array $L_2$ has a focal length $f_2$. The imaging relation of this compound eye optical system is such that the object point O on the optical axis X lying at a distance $S_1$ from the multilens array $L_1$ is imaged at a point $T_0$ on the image plane Y by a lens $P_0$ on the optical axis of the multilens array $L_1$. This image plane Y will hereinafter be referred to as the intermediate image plane. The imaging point $T_0$ on the optical axis is re-imaged at a point I on the image plane V lying at a distance $S_k$ from the multilens array $L_2$ by a lens $Q_0$ on the optical axis of the multilens array $L_2$. This re-imaging plane V will hereinafter be referred to as the imaging plane of the compound eye optical system. The object point O is imaged as an off-axis image at a point $T_1$ on the intermediate image plane Y by a lens $P_1$ in the multilens array $L_1$ which lies at a distance D from the optical axis. Further, the point image $T_1$ is imaged in coincidence with the image point I on the imaging plane V by a lens $Q_1$ in the multilens array $L_2$ which lies at a distance d from the optical axis. A similar imaging relation is also established with respect to other lenses in the multilens arrays $L_1$ and $L_2$. Thus, the object point O is separately formed as images $T_0, T_1, \ldots$ corresponding in number to the lenses of the multilens array $L_1$ on the image planes of the lenses $P_0, P_1, \ldots$ in the multilens array $L_1$ disposed on the object side, by these lenses $P_0, P_1, \ldots$ These separately formed images are re-imaged as the image I of the only object point on the imaging plane V by the multilens array $L_2$ disposed on the image side.

The light ray passing through the center of the lens $P_1$ shown in FIG. 1 is unnaturally bent on the intermediate image plane Y, but this may be made natural by disposing a field lens or the like on the intermediate image plane. Next, the condition for forming the only object point will be geometrically sought after by reference to FIG. 1.

As described above, the condition for forming the only image I of the object point O is that in the imaging plane V of the compound eye optical system, the lights from the respective lenses of the multilens array intersect one another and that the place of intersection is the focusing plane. The relation between the parameters of the compound optical system is derived from the geometrical relation for satisfying this condition.

The conditions necessary for the light beams from the lens groups to be focused on the required imaging plane may be shown as follows from the paraxial imaging relation by the use of magnifications $\beta$, $S_1$, $E$, $S_k$, $f_1$ and $f_2$:

$$(1-\beta)\{E + S_k - S_1 \cdot \beta\} \cdot f_2^2 - \tag{1}$$
$$\{E \cdot S_k(1-\beta) + E \cdot S_k - S_1 \cdot S_k \cdot \beta + S_k^2\}f_2 + E \cdot S_k^2 = 0$$

$$f_1 = \frac{S_1 \cdot \beta \cdot f_2}{f_2 - S_k - \beta \cdot f_2} \tag{2}$$

where $S_1 < 0$. Where the object distance $S_1$ is infinite, from the paraxial imaging relation, by applying $$S_1 \cdot \beta = f$$

using the focal length f of the entire compound eye optical system, equations (1) and (2) may be represented as:

$$(E + S_k - f) \cdot f_2^2 - (2E \cdot S_k - S_k \cdot f + S_k^2)f_2 + E \cdot S_k^2 = 0 \tag{1'}$$

$$f_1 = \frac{f \cdot f_2}{f_2 - S_k} \tag{2'}$$

Description will now be made of the condition for the lights from the respective lens groups to intersect and coincide with one another on the imaging plane V. If the ratio of the lens array pitch D of the multilens array $L_1$ on the object side to the lens array pitch d of the multilens array $L_2$ on the image side is Z, then $$Z = \frac{D}{d} = \frac{-S_1(S_3 + S_k)}{S_k(-S_1 + S_2)} \tag{3}$$

where $S_2$ is the distance from the multilens array $L_1$ to the intermediate image plane Y and $S_3$ is the distance from the intermediate image plane Y to the multilens array $L_2$. From the focal length $f_1$ of the multilens array $L_1$, the focal length $f_2$ of the multilens array $L_2$, the intermediate image and the relation in which the intermediate image is formed on the last image plane, the following is derived:

$$S_2 = \frac{S_1 \cdot f}{S_1 + f} \quad (4)$$

$$S_k = \frac{S_3 \cdot f_2}{S_3 - f_2} \quad (5)$$

Also, from $$E = S_2 + S_3 \quad (6),$$

the following is derived:

$$f_2 \cdot Z - E\left(1 + \frac{f_1}{S_1}\right) + f_1 = 0 \quad (7)$$

This equation (7) is the condition for the individual lights from the lens groups to intersect and coincide with one another on the imaging plane V.

Accordingly, by varying at least three of $S_1$, $S_k$, E, $f_1$, $f_2$ and Z so that equations (1), (2) and (7) may be established when $\beta$ has been varied, magnification change of the compound eye optical system becomes possible. When the object distance $S_1$ is infinite, at least three of E, $S_k$, $f_1$, $f_2$, Z and f may be varied to thereby satisfy the equations (1)', (2)' and (7) and effect magnification change of the compound eye optical system.

Figure 2:
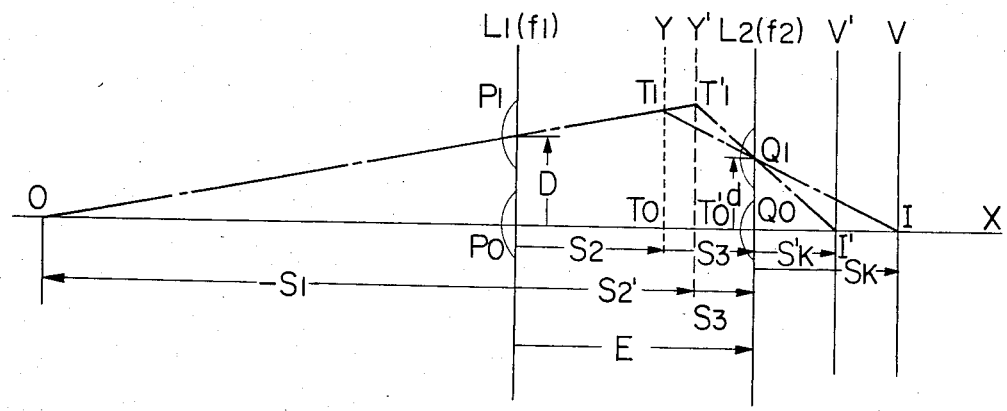
FIG. 2 shows the imaging relation in an embodiment of the compound eye optical system according to the present invention.

Reference is now had to FIG. 2 to describe an embodiment in which magnification change is effected by varying the focal lengths $f_1$ and $f_2$ of the first and second minute imaging element arrays and the spacing $S_k$ between the second minute imaging element and the image plane. In FIG. 2, the intermediate image of the object point O is formed as $T_0$ and $T_1$ on the intermediate image plane Y by the lenses $P_0$, $P_1$ ... of the first multilens array $L_l$. Further, these intermediate images $T_0$ and $T_1$ are re-imaged as the only image point I on the imaging plane V by the second multilens array $L_2$. At this time, the imaging magnification $\beta_{10}$ of the entire compound eye optical system can be represented as the product of the imaging magnification $\beta_{11} = S_2/S_1$ of the intermediate image by the first multilens array $L_1$ and the re-imaging magnification $\beta_{12} = -S_k/S_3$ of the intermediate image by the second multilens array $L_2$.

$$\beta_{10} = \beta_{11} \times \beta_{12} = -\frac{S_2}{S_1} \times \frac{S_k}{S_3}$$

Accordingly, to vary the imaging magnification $\beta_{10}$ of the entire system, $\beta_{11}$ and $\beta_{12}$ may be varied to vary the value of the product of them. As the means for varying such value, the focal lengths $f_1$ and $f_2$ of the first and second multilens arrays are varied.

In FIG. 2, Y' and V' designate the intermediate image plane and the imaging plane when the focal lengths of the multilens arrays $L_1$ and $L_2$ have been varied. $T_0'$ and $T_1'$ denote the image points whereat the object point O is separately formed by the first multilens array $L_1$, and I' designates the point whereat they are re-imaged as a point on the imaging plane. $S_2' + S_3' = E$, that is, the spacing between the first multilens array $L_1$ and the second multilens array $L_2$ is constant. At this time, the position of the imaging plane V' of the entire system, or in other words, the value of $S_k$, becomes $S_k'$. As shown in FIG. 2, even if the imaging magnification $\beta$ of the compound eye optical system by varying the focal lengths of the multilens arrays $L_1$ and $L_2$ and the value of $S_k$, the light beams from the lenses of the multilens arrays intersect one another on the imaging plane V' and the imaging plane V' is at the position of the focusing plane.

Some embodiments of the compound eye optical system obtained by the magnification changing method of the present invention will be shown below.

Figure 3:
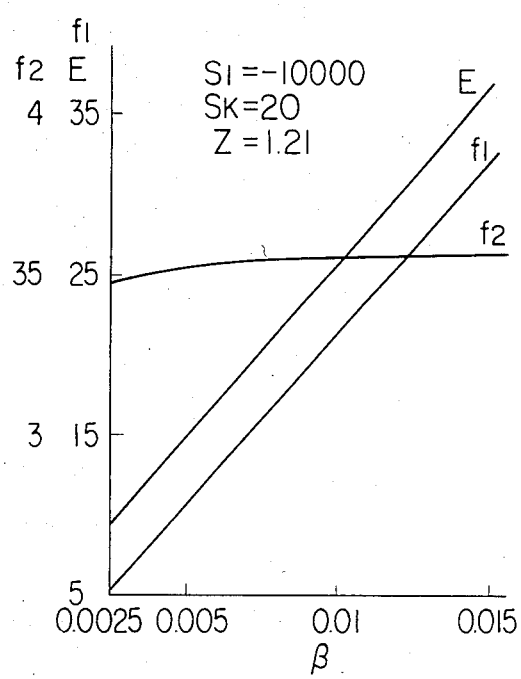
FIGS. 3, 4 and 5 show the relation between the physical amount variable for magnification change and the imaging magnification in the compound eye optical system according to the present invention.

A first embodiment is such that the focal length $f_1$ of a first minute imaging element array, the focal length $f_2$ of a second minute imaging element array and the spacing E between the first minute imaging element array and the second minute imaging element array are varied so that equations (1), (2) and (7) are satisfied when the distance $S_1$ from the first minute imaging element array to the object point is fixed at 10000 mm and the distance from the second minute imaging element array to the image point is fixed at 20 mm and the pitch ratio of the first and second minute imaging element H; arrays is fixed at 1.21 and the value of the imaging magnification $\beta$ is varied. FIG. 3 shows how the values of $f_1$, $f_2$ and E at this time vary relative to the value of $\beta$. In FIG. 3, the abscissa shows the value of $\beta$ in the range of 0.0025 to 0.015 and the ordinate shows the values of $f_1$, $f_2$ and E, $f_1$ and E being shown by the same scale and $f_2$ being shown by a different scale. It is seen from FIG. 3 that for example, when $\beta = 0.005$, E = 15 mm, $f_1 = 10.7$ mm and $f_2 = 3.53$ mm.

Figure 4:
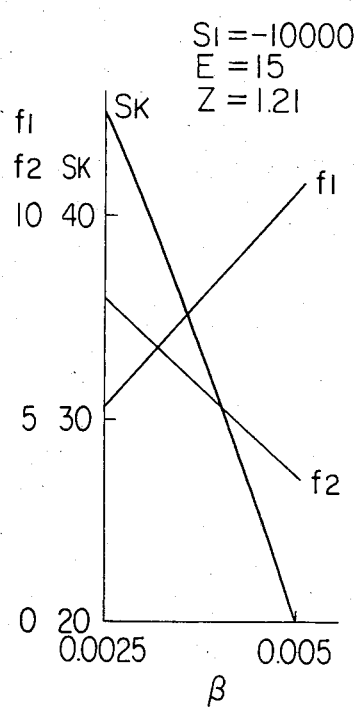

A second embodiment is such that the focal length $f_1$ of a first minute imaging element array, the focal length $f_2$ of a second minute imaging element array and the value of the spacing $S_k$ between the second minute imaging element array and the imaging plane are varied so that equations (1), (2) and (7) are satisfied when the distance $S_1$ from the first minute imaging element array to the object point is fixed at 10000 mm and the spacing E between the first and the second minute imaging element array is fixed at 15 mm and the pitch ratio Z of the first and second minute imaging element arrays is fixed at 1.21 and the imaging magnification $\beta$ is varied. FIG. 4 shows the manner of variation of the values of $f_1$, $f_2$ and $S_k$ at this time relative to the variation in the value of $\beta$. In FIG. 4, the abscissa shows the value of $\beta$ and the ordinate shows $f_1$ and $f_2$ by the same scale and $S_k$ by a different scale.

Figure 5:
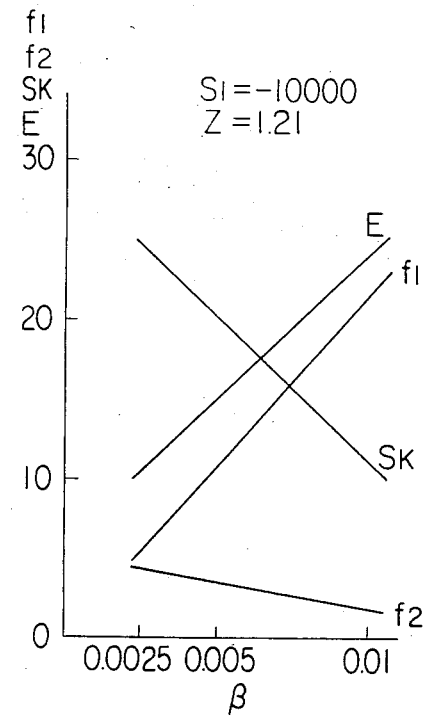
Figure 6A:
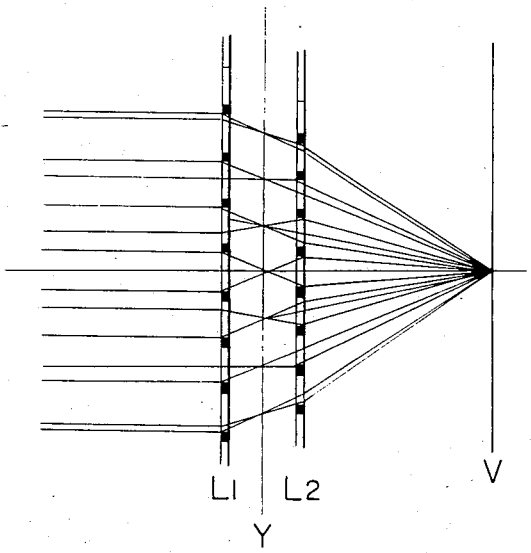
FIGS. 6A and 6B show the optical paths of the compound eye optical system shown in FIG. 5.
Figure 6B:
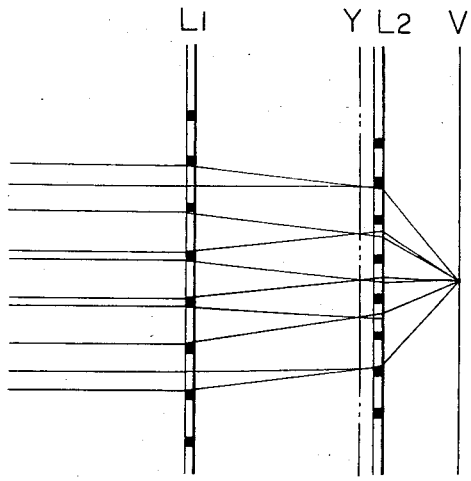

A third embodiment is such that the focal lengths $f_1$ and $f_2$ of a first and a second minute imaging element array, the value of the spacing E between the first and the second minute imaging element array and the value of the spacing $S_k$ between the second minute imaging element array and the imaging plane are varied so that equations (1), (2) and (7) are satisfied when the distance $S_1$ from the first minute imaging element array to the object point is fixed at 10000 mm and the pitch ratio Z of the first and second minute imaging element arrays is fixed at 1.21 and the imaging magnification $\beta$ is varied. FIG. 5 shows the manner of variation of $f_1$, $f_2$, E and $S_k$ relative to the variation in the value of $\beta$ at this time. In FIG. 5, the abscissa shows $\beta$ and the ordinate shows $f_1$, $f_2$, E and $S_k$. FIGS. 6A and 6B schematically show the optical paths of the third embodiment. FIG. 6A shows the optical path when $\beta$ is 0.0025, and FIG. 6B shows the optical path when $\beta$ is 0.01. As described above, $L_1$ designates the first minute imaging element, $L_2$ denotes the second minute imaging element, Y designates the intermediate image plane, and V denotes the imaging plane.

Figure 7:
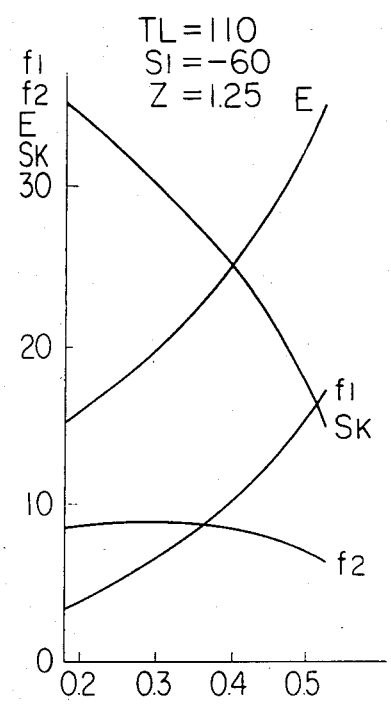
FIGS. 7 and 8 show the relation between the physical amount variable for magnification change and the imaging magnification in the compound eye optical system according to the present invention.

A fourth embodiment is such that when the pitch ratio Z of a first and a second minute imaging element array is fixed at 1.25 and the spacing $S_1$ between the first minute imaging element array and the object point is fixed at 60 mm and the distance TL from the object point to the image plane is fixed at 110 mm and the imaging magnification $\beta$ is varied, the focal lengths $f_1$ and $f_2$ of the first and second minute imaging element arrays, the value of the spacing E between the first and second minute imaging element array and the value of the spacing $S_k$ between the second minute imaging element array and the image plane are varied to satisfy equations (1), (2) and (7). FIG. 7 shows the manner of variation of $f_1$, $f_2$, E and $S_k$ relative to the variation in the value of $\beta$ at this time. In this embodiment, $S_1$ and TL are constant and therefore, the value of $E+S_k$ also is constant.

Figure 8:
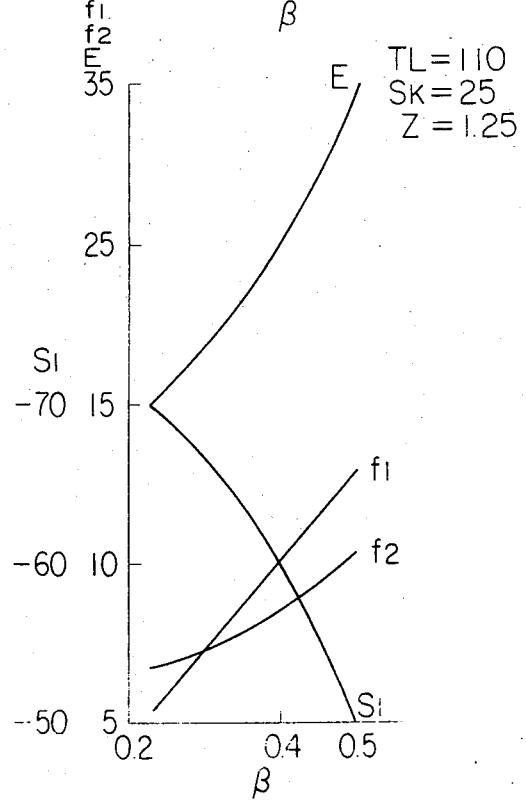

A fifth embodiment is such that when the pitch ratio Z of a first and a second minute imaging element array is fixed at 1.25 and the spacing $S_k$ between the second minute imaging element array and the imaging plane is fixed at 25 mm and the distance TL from the object point to the image plane is fixed at 110 mm and the imaging magnification $\beta$ is varied, the focal lengths $f_1$ and $f_2$ of the first and second minute imaging element arrays, the value of the spacing E between the first and the second minute imaging element array and the value of the spacing $S_1$ between the first minute imaging element array and the object point are varied to satisfy equations (1), (2) and (7). FIG. 8 shows the manner of variation of $f_1$, $f_2$, E and $S_1$ relative to the variation in the value of $\beta$ at this time. In FIG. 8, the abscissa shows $\beta$ and the ordinate shows $f_1$, $f_2$ and E by the same scale and $S_1$ by a different scale. In this embodiment, $S_k$ and TL are constant and therefore, the value of $S_1+E$ also is constant.

FIG. 9 is a perspective view showing an embodiment having a construction corresponding to the fourth embodiment. In FIG. 9, reference numeral 11 designates the object surface, reference numeral 12 denotes a first minute imaging element array, reference numeral 13 designates a second minute imaging element array, and reference numeral 14 denotes the imaging plane. The first minute imaging element array is constituted by two optical elements 12a and 12b, each of which comprises nine minute imaging elements. These optical elements 12a and 12b cause a relative positional deviation in a direction indicated by arrow $A_1$, whereby the focal lengths of the imaging elements are varied. These optical elements are the same as the optical elements shown in the aforementioned U.S. Pat. No. 3,305,294. The second minute imaging element array also comprises two optical elements 13a and 13b, each of which comprises nine minute imaging elements disposed two-dimensionally. The image of the object surface 11 is formed on the imaging plane 14 by the first and second minute imaging element arrays 12 and 13. The construction of the optical system during magnification change will now be shown. A rack 15 is secured to the optical element 12a of the first minute imaging element array, and a pinion 17 rotatable by a motor 16 is in mesh engagement with the rack 15. Accordingly, by rotation of the motor 16, the rotational movement of the pinion 17 provides rectilinear movement of the rack 15 and therefore, the optical element 12a moves in the direction of arrow $A_1$. On the other hand, the optical element 12b is supported by a member 18 secured to a housing (not shown) and the optical element 12b in its fixed state. Therefore, by movement of the optical element 12a, the focal lengths of the minute imaging elements are varied.

A rack 19 is secured to the optical element 13a of the second minute imaging element array, and a pinion 21 rotatable by a motor 20 fixedly mounted on a base plate 22 is in mesh engagement with the rack 19. As the motor 20 rotates, the pinion 21 is rotated and this rotational movement is converted into rectilinear movement by the rack 15 to thereby move the optical element 13a in the direction of arrow $A_2$. On the other hand, the element 13b is fixed by support member 23 secured onto the base plate 22 and accordingly, by movement of the optical element 13a, the focal lengths of the minute imaging elements are varied.

The base plate 22 is provided so as to be movable in the direction of arrow $A_3$, i.e., the direction of the optical axis of the optical system, by a feed screw mechanism. Reference numeral 24 designates a male feed screw and reference numeral 25 denotes a female screw threadably engaged with the male screw 24. The female screw 25 is secured to the base plate 22. The male feed screw 24 has secured thereto a gear 26 which is in mesh engagement with a gear 27 directly connected to a motor 28. Accordingly, as the motor 28 rotates and the gear 27 is rotated, the rotational movement thereof is transmitted through the gear 26 to the male feed screw 24 to rotate this screw 24. As the male feed screw 24 is rotated, the base plate 22 is moved in the direction of arrow $A_3$ through the female screw 25 threadably engaged with the male screw 24. Designated by 29 and 30 are bearings for supporting the male feed screw. The bearings 29 and 30 are secured to a housing (not shown). By such feed screw construction, the spacing between the first imaging element array 12 and the second imaging element array 13 and the spacing between the second imaging element array 13 and the imaging plane 14 can be varied.

As noted above, any three of $S_1$, $S_K$, E, $f_1$, $f_2$, and Z may be varied to effect magnification change. Thus the device of FIG. 9 could be adapted for use with $S_1$ and Z as two of the at least three variables. In such case the adjustment of $S_1$, could be effected by moving the first array 12 in direction $A_4$ as by a base plate similar to base plate 22 while the adjustment of the pitch ratio could be effected by replacing one of the lens arrays with an imaging array having a different imaging element pitch. Such a change is represented by arrow direction $A_5$.

As described above, the compound eye optical system according to the present invention can be used in various manners, for example, as a conventional picture-taking optical system in which the image plane is fixed, a copying optical system in which the length of the optical path between the object surface and the imaging plane is constant, or a reading optical system.

Further, in the compound eye optical system according to the present invention, magnification change is possible without using the other optical members than those constituting the compound eye optical system and the imaging magnification can be continuously varied.

What we claim is:

1. A compound eye optical system having a variable magnification function, comprising:
a first imaging element array component comprising a plurality of imaging elements of the same focal length arranged at an equal pitch;
a second imaging element array component comprising a plurality of imaging elements of the same focal length arranged at a pitch different from that of said first imaging element array component, said second imaging element array component being disposed more adjacent to the image side than said first imaging element array component, a composite optical system consisting of said first imaging element array component and said second imaging element array component forming an image of an object on an image plane; and means for varying the imaging magnification of the image of the object on the image plane formed by said composite optical system with respect to the same object, said varying means comprising at least three of the following six means all of which three means are varied for each magnification change;

first means for varying the focal lengths of the imaging elements forming said first imaging element array component;

second means for varying the focal lengths of the imaging elements forming said second imaging element array component;

third means for varying the spacing between said first imaging element array component and said second imaging element array component;

fourth means for varying the spacing between said first imaging element array component and the object point;

fifth means for varying the spacing between said second imaging element array component and the image point; and sixth means for varying the value of the ratio of the pitch of the imaging elements of said first imaging element array component to the pitch of the imaging elements of said second imaging element array component.

2. A compound eye optical system according to claim 1, wherein said means for varying the imaging magnification is said first, second and third means.

3. A compound eye optical system according to claim 1, wherein said means for a varying the imaging magnification is said first, second and fifth means.

4. A compound eye optical system according to claim 1, wherein said means for varying the imaging magnification is said first, second, third and fifth means.

5. A compound eye optical system according to claim 1, wherein said means for varying the imaging magnification is said first, second, third and fourth means.

* * * * *